US008569963B2

(12) United States Patent
Walters

(10) Patent No.: US 8,569,963 B2
(45) Date of Patent: Oct. 29, 2013

(54) CASCADE BOOST AND INVERTING BUCK CONVERTER WITH INDEPENDENT CONTROL

(75) Inventor: Michael M. Walters, Apex, NC (US)

(73) Assignee: Intersil Americas Inc., Milpitas, CA (US)

(*) Notice: Subject to any disclaimer, the term of this patent is extended or adjusted under 35 U.S.C. 154(b) by 160 days.

(21) Appl. No.: 13/291,377

(22) Filed: Nov. 8, 2011

(65) Prior Publication Data

US 2012/0319604 A1    Dec. 20, 2012

Related U.S. Application Data

(60) Provisional application No. 61/498,126, filed on Jun. 17, 2011.

(51) Int. Cl.
*H05B 37/02*    (2006.01)
*H02M 7/06*    (2006.01)

(52) U.S. Cl.
USPC .................... 315/200 R; 315/209 R; 363/126

(58) Field of Classification Search
None
See application file for complete search history.

(56) References Cited

U.S. PATENT DOCUMENTS

2006/0113975 A1* 6/2006 Mednik et al. ................. 323/282
2007/0187376 A1* 8/2007 Albrecht et al. ........... 219/130.1

OTHER PUBLICATIONS

Cuk, Slobodan et al. "Advances in Switched-Mode Power Conversion Part I". IEEE Transactions on Industrial Electronics, vol. IE-30, No. 1, Feb. 1983. pp. 10-19.

De Brito, J.R. et al. "A Proposal of Led Lamp Driver for Universal Input Using Cuk Converter." Federal University of Uberlandia, Electrical Engineering Faculty, Power Electronics Research Group. 2008 IEEE. pp. 2640-2644.
Cuk, Slobodan et al. "A New Optimum Topology Switching DC-to-DC Converter." 1977 IEEE. Reprinted, with permission, from Proceedings of the IEEE Power Electronics Specialists Conference, Jun. 14-16, 1977, Palo Alto, CA. pp. 311-330.
"Hysteretic Boost-Buck (Cuk) LED Driver ID." Datasheet. Doc # DSFP-HV9930 C030311. Supertex Inc. 1235 Bordeaux Drive, Sunnyvale, CA 94089, pp. 1-7 2011.
"Dimmable Offline LED Driver with iW3610 (AC Input 180~264$V_{AC}$, Output 5-6 LEDs 18V/350mA) EBC864." Rev. 1.0. iWatt Inc. 101 Albright Way, Los Gatos, CA 95032, Jul. 2010. pp. 1-7.
Maksimović, Dragan et al. "Switching Converters with Wide DC Conversion Range." IEEE Transactions on Power Electronics, vol. 6, No. 1, Jan. 1991 pp. 151-157.

(Continued)

*Primary Examiner* — Jany Richardson
(74) *Attorney, Agent, or Firm* — Gary Stanford

(57) ABSTRACT

A converter system including a cascade boost converter and inverting buck converter and controller for converting a rectified AC voltage to a DC output current. The system uses inductors and is configured to use a common reference voltage. The controller is configured to control switching of the converters in an independent manner to decouple operation from each other. For example, control pulses for the boost converter may be wider than pulses for the buck converter. The controller may control the boost converter based on constant on-time control and may control the inverting buck converter based on peak current control. The rectified AC voltage may be an AC conductive angle modulated voltage, where the controller may inhibit switching of the inverted buck converter at a dimming frequency having a duty cycle based on a phase angle of the AC conductive angle modulated voltage.

19 Claims, 6 Drawing Sheets

(56) References Cited

OTHER PUBLICATIONS

Chen, Jingquan et al., "A New Low-Stress Buck-Boost Converter for Universal-Input PFC Applications." © 2001 IEEE Colorado Power Electronics Center, Department of Electrical and Computer Engineering, University of Colorado at Boulder, Boulder, CO 80309-0425. pp. 343-349.

* cited by examiner

CASCADE BOOST AND INVERTING BUCK CONVERTER WITH INDEPENDENT CONTROL

CROSS-REFERENCE TO RELATED APPLICATIONS

This application claims the benefit of U.S. Provisional Application Ser. No. 61/498,126, filed on Jun. 17, 2011, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Figure 1:
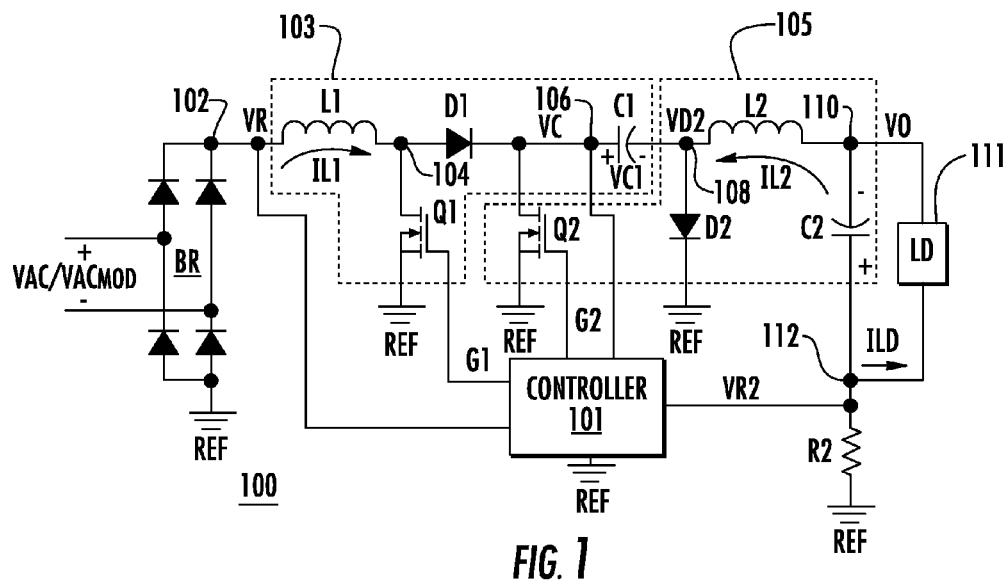
FIG. 1 is a schematic and block diagram of a cascade boost and inverting buck converter implemented according to one embodiment.

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Powering light-emitting diodes (LEDs) for illumination from the existing AC (alternating current) infrastructure means that the converter should be able to meet rigid power quality standards for power factor and input harmonic current, regulate the LED current without flicker, and smoothly control the illumination when operated from existing dimmers (e.g., incandescent or TRIAC dimmers).

Energy storage enables LEDs to be powered without flicker from an AC source, especially when dimming extends the time the AC input voltage is zero. However, energy storage is also problematic when dimming from the installed base of TRIAC dimmers. Once triggered, an inrush current recharges the energy storage capacitance of the converter and can cause the high-Q input filter to resonate below the TRIAC holding current, in which case the TRIAC turns off and retriggers within one half cycle of the line frequency. This causes chaotic dimming operation and flicker.

One class of conventional solutions regulates the LED current and uses a single stage converter after AC rectification to achieve high power factor. The energy delivered with this approach varies with the AC input. Large energy storage capacitance, however, is needed across the output of the converter and the LED load to smooth the rectified line frequency ripple. A snubber network is often necessary to limit peak voltage of an electronic switching device, such as a field-effect transistor (FET) or the like, due to leakage inductance.

Another type of conventional converter, known as a flyback LED driver, eliminates the rectified AC input frequency ripple on the output to help minimize the energy storage. However, the flyback converter has pulsating (not continuous) output current and high output capacitance. A snubber network may be necessary to limit peak voltage of the electronic switching device due to leakage inductance. Another type of conventional converter, known as the Cuk converter, provides continuous output current and reduces the output capacitance. However, the Cuk type converter does not address off-line AC dimming issues, such as dimming angle extraction, maintaining the TRIAC holding current, and dampening the ringing energy of the input filter. The Cuk converter configuration assumes an external signal that modulates a pulse width modulation (PWM) pin to dim the LEDs.

To achieve low cost, the power converter topology should avoid transformers and use single ended components and signals or components and signals referenced to a common voltage. Single ended signals and components or signals and components referenced to a common voltage are less expensive than floating nodes that require level shifting or isolation.

Disclosed herein is a converter that uses inductors instead of transformers and is configured to use single ended or commonly referenced control signals. The disclosed converter meets the rigid power quality standards for power factor and input harmonic current, regulates the output current with minimal ripple, and, when used as an LED driver with a dimmer, smoothly controls the illumination when operated from existing dimmers. Although the converter is particularly advantageous for use as an off-line LED driver, the converter may be used to drive other types of DC loads as further described herein. Examples of regulatory standards may include Energy Star standards associated with the power factor and lifetime (e.g., Energy Star LM-80-08), harmonic content standards, such as the IEC (International Electrotechnical Commission) 6100-3-2 Class C Limits, electromagnetic interference (EMI) standards, such as CFR (Code of Federal Regulations (CFR) Title 47 Part 15 Class B Limits, safety standards, such as UL (Underwriters Laboratories) 8750 and IEC 61347, etc.

Disclosed herein is a novel cascade boost and inverting buck converter with independent control. The cascade converter operates from a rectified AC source and controls output current. The converter control signals share a common voltage reference providing a common reference for feedback signals and for driving electronic switching devices. Additionally, for an LED driver configuration, a novel control method achieves PWM dimming control by disabling the inverting buck converter and using a boost converter to suppress ringing on the input filter and providing a path for the dimmer's leakage and holding current.

FIG. 1 is a schematic and block diagram of a cascade boost converter and inverting buck converter 100 implemented according to one embodiment. An input AC voltage VAC is provided to a rectifier network shown as a bridge rectifier BR, which is coupled between a node 102 and a reference node REF. The reference node has a reference voltage level which may be positive, negative or ground and serves as a common voltage reference for the components and signals. In the illustrated embodiment, BR includes four diodes in a bridge configuration as understood by those of ordinary skill in the art to develop a rectified voltage VR on node 102. Node 102 is coupled to one end of an inductor L1 which has its other end coupled to a node 104. Node 104 is coupled to the anode of a diode D1 and to the drain of an electronic switch Q1 shown as an N-channel metal-oxide semiconductor, field-effect transistor (MOSFET). The cathode of D1 is coupled to a node 106, which is further coupled to one end of a capacitor C1 and to the drain of another electronic switch Q2, which is also configured as an N-channel MOSFET. The other end of C1 is coupled to a node 108, which is further coupled to the anode of another diode D2 and to one end of another inductor L2. The cathode of D2 and the sources of Q1 and Q2 are coupled to REF. Node 108 develops a voltage VD2 relative to REF (voltage across D2), and a voltage VC1 is developed across C1. A voltage VC is developed on node 106 and may be determined as VC1+VD2. The other end of L2 is coupled to an output node 110, which develops an output voltage VO. An output capacitor C2 has one end coupled to output node 110 and another end coupled to a node 112. A sense resistor R2 is coupled between node 112 and REF, and node 112 develops a current sense voltage VR2.

The switches Q1 and Q2 are shown implemented using MOSFETs, although other types of switching devices are contemplated, such as other similar forms (e.g., FETs, MOS devices, etc.), bipolar junction transistor (BJTs) and the like, insulated-gate bipolar transistors (IGBTs) and the like, etc.

A load (LD) 111 is coupled between nodes 110 and 112. A controller 101 is coupled (referenced) to REF, is coupled to nodes 102, 106 and 112, and provides gate drive signals G1 and G2 to the gates of Q1 and Q2, respectively. The current flowing from node 102 to node 104 through L1 is shown as a current IL1 and the current flowing from node 110 to node 108 through L2 is shown as a current IL2. The current flowing from node 112 to node 110 through the load 111 is shown as ILD. The resistance of R2 is sufficiently low so that the voltage VR2 is very low to be negligible relative to VO yet sufficiently high to achieve an accurate measurement of IL2.

The converter 100 includes a boost converter 103 (including L1, Q1, D1, C1) in cascade configuration with an inverting buck converter 105 (including L2, Q2, D2, C2) in which capacitor C1 is an intermediate capacitor coupled between the converters and capacitor C2 is an output capacitor. The controller 101 controls the boost converter 103 and the buck converter 105, in which such control is substantially independent with respect to each other. In one embodiment described herein, both switches Q1 and Q2 are turned on at about the same time based on a common clock signal, yet each is turned off in a substantially independent manner. Alternative configurations are contemplated including configurations without a clock signal. The topology of the converter 100 does not require the use of a transformer (although a transformer may be used if desired), and has a single reference connection (REF) for the converters 103 and 105 and for the control signals. In addition, the converter 100 meets the AC quality standards for power factor and input harmonic current, and regulates the load current ILD through the load 111. When the load 111 is a series of LEDs as further described herein, the load current through the LEDs is regulated without flicker, and illumination of the LEDs is smoothly controlled when operated from existing dimmers.

The controller 101 is commonly referenced to the sources of Q1 and Q2 and shares a common reference connection REF with the feedback signals. The common reference REF avoids the complication and expense of level shifters or isolation circuits. In one embodiment, the controller 101 turns on both Q1 and Q2 at the same time based on a common clock signal CLK (FIG. 2), but the turn-off of Q1 occurs after Q2 is turned off. Thus, the duty cycle of Q1 (D1) is wider than the duty cycle of Q2 (D2), which effectively decouples the buck and boost operation. Stated another way, each boost pulse is wider than a corresponding buck pulse as further described herein.

Figure 2:
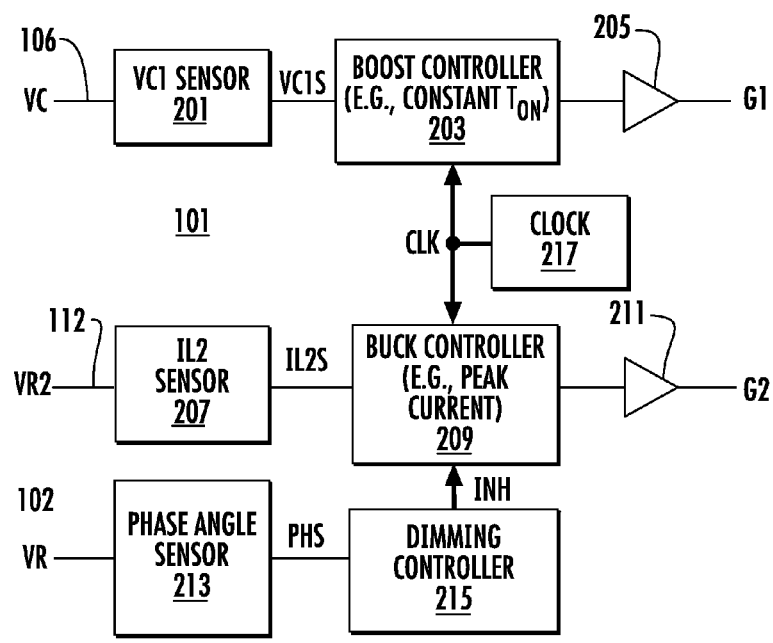
FIG. 2 is a simplified block diagram of the controller of FIG. 1 implemented according to an exemplary embodiment.

FIG. 2 is a simplified block diagram of the controller 101 implemented according to an exemplary embodiment. A VC1 sensor 201 is coupled to node 106 for sensing the voltage VC1 and provides a sense indication VC1S to a boost controller 203. The boost controller 203 may be configured as a constant on-time ($T_{ON}$) generator, although alternative configurations are contemplated. The boost controller 203 receives the CLK signal and has an output for controlling Q1 via the gate signal G1 through a gate driver 205. An IL2 current sensor 207 is coupled to node 112 for sensing the voltage VR2 for providing a sense indication IL2S to a buck controller 209. The buck controller 209 may be configured as a peak current controller, although alternative configurations are contemplated. Substantially the same current that flows through sense resistor R2 also flows through L2 as current IL2, so that the voltage of VR2 indicates the current level of IL2. The buck controller 209 receives CLK and has an output for controlling Q2 via the gate signal G2 through a gate driver 211. A phase angle sensor 213 is coupled to node 102 for sensing VR and the corresponding phase angle in accordance with dimming operation, and provides a phase sense indication PHS to a dimming controller 215. The dimming controller 215 asserts an inhibit signal INH to the buck controller 209. A clock circuit 217 provides the clock signal CLK to the controllers 203 and 209. The clock circuit 217 either generates CLK or conveys or develops CLK from a separate or external timing source.

Although node 106 develops the voltage VC, in one embodiment, the VC1 sensor 201 samples VC at selected times when VD2 is low so that VC is substantially the same as VC1 relative to REF. The sampled value is held as VCS1. In one embodiment, the VC1 sensor 201 periodically samples the voltage VC of node 106 when Q1 and Q2 are both off (when G1 and G2 are both low) and when the diode D2 is "on" (e.g., D2 is forward biased with only a diode voltage drop) to develop VC1S. In one embodiment, for example, VC1S is a sampled voltage value which is updated after each cycle of CLK (or updated periodically after any number of CLK cycles). Under this condition when D2 is on, the voltage across D2 is substantially negligible relative to VC1 so that node 106 accurately reflects the voltage VC1 relative to REF.

In one embodiment, the boost controller 203 is configured as a constant on-time generator having an on-time value $T_{ON}$ which is constant over a number of cycles of CLK, and which is periodically updated to loosely regulate VC1 to a predetermined target voltage level or to maintain VC1 within a predetermined target voltage range. In one embodiment, for example, on-time value $T_{ON}$ may be updated every cycle or half-cycle of VAC.

A dimmer or the like, such as a dimmer 1002 (FIG. 10), may be provided which receives the AC voltage VAC and operates to selectively chop one or both of the leading edge and the trailing edge of VAC at any "dimming angle" $\theta_{DIM}$ between 0 and 180 degrees for every half cycle (i.e., 180 degrees), to provide an AC conductive angle modulated voltage or "chopped" voltage $VAC_{MOD}$. VAC may have the normal characteristic sinusoidal shape as AC line voltage as understood by those of ordinary skill in the art (e.g., see VAC of FIG. 4). In one embodiment, when VAC is chopped for dimming operation to provide $VAC_{MOD}$, the leading edge of each half cycle is zeroed or chopped up to the dimming angle $\theta_{DIM}$ and then retains its normal shape for the duration of the half cycle (e.g., see $VAC_{MOD}$ of FIG. 5). The phase angle sensor 213 is configured to detect the phase or dimming angle applied to VAC and to develop PHS accordingly. The phase angle sensor 213, for example, may be implemented with counters or the like or any other suitable digital techniques for sensing the dimming angle $\theta_{DIM}$ and providing PHS.

The dimming controller 215 receives PHS and develops the INH signal to reflect the relative amount of dimming based on the detected dimming angle. In one embodiment, a periodic dimming signal is generated at a selected dimming frequency having a duty cycle based on the dimming angle. In one embodiment, the duty cycle is very low or zero with no dimming up to a maximum value which corresponds with full dimming. The dimming duty cycle may be represented as a relative percentage associated with the detected dimming angle. As an example, if VAC is clipped by 50% so that $VAC_{MOD}$ is zero from 0 to 90 degrees and again from 180 to 270 degrees, then the phase angle is 90 degrees and the duty cycle of the dimming signal is 50%. The INH signal is asserted based on the duty cycle of the dimming signal.

As an example, PHS may be asserted low when $VAC_{MOD}$ is zero and high when $VAC_{MOD}$ is non-zero, such that PHS has a frequency of about twice VAC with a duty cycle associated with the dimming angle. The dimming controller 215 converts PHS to INH having a square-wave shape at a selected dimming frequency and having a duty cycle based on the duty cycle of PHS, so that the duty cycle of INH is also based on the dimming angle. Inverted versions of PHS and/or INH are contemplated as well.

The frequency of CLK is generally substantially higher than the frequency of VAC. In one embodiment, for example, VAC is a relatively low frequency, such as an AC line frequency of 50-500 Hertz (Hz) or the like (e.g., 50 Hz, 60 Hz, 400 Hz, etc.). The frequency of CLK may be several kiloHertz (kHz) or several tens of kHz (e.g., such as up to 100 kHz or more) depending upon the particular implementation. The dimming frequency is an intermediate frequency relative to VAC and CLK and is effectively bounded on the low end to avoid flickering and on the high end by the switching frequency of CLK and to ensure a sufficient level of the load current ILD. As an example, the frequency of the dimming signal is one-tenth or less than the frequency of CLK to ensure a sufficient number of cycles of the switching of Q2 so that the appropriate level of ILD is developed.

Figure 3:
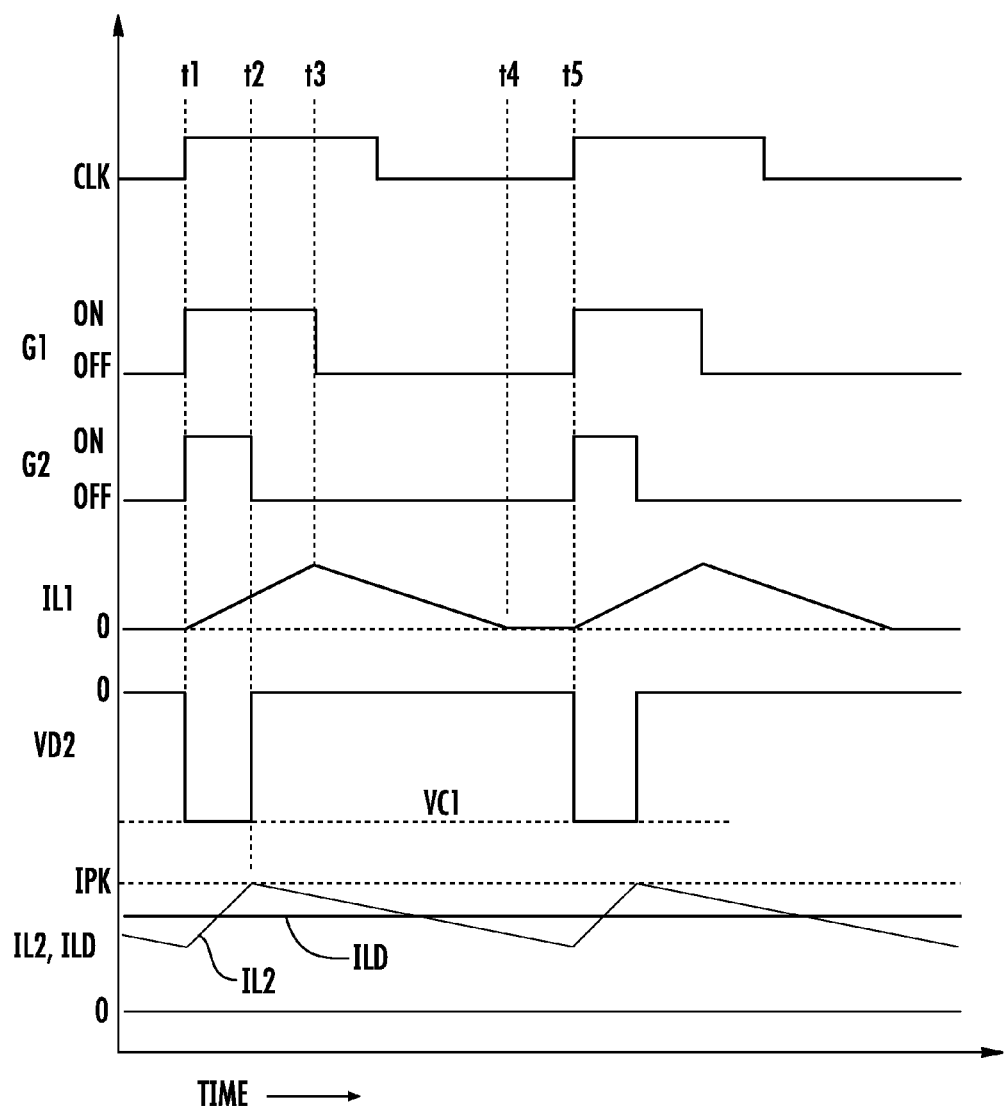
FIG. 3 is a timing diagram showing exemplary waveforms of the converter of FIG. 1 during each cycle of CLK using the controller illustrated in FIG. 2 according to one embodiment.

FIG. 3 is a timing diagram showing exemplary waveforms of the converter 100 during each cycle of CLK using the controller 101 illustrated in FIG. 2 according to one embodiment in which the boost converter 203 is configured as a constant on-time generator and the buck controller 209 is configured as a peak current controller. As shown, the signals CLK, G1, G2, IL1, VD2, IL2 and ILD are plotted versus time. The duty cycle of CLK is shown near 50% although any duty cycle is contemplated. G1 and G2 toggle high and low indicative of turning on and off the switches Q1 and Q2, respectively. IL2 and ILD are superimposed together at the lower end of the diagram. Q1 is operated with constant on-time control (in which $T_{ON}$ is periodically adjusted to maintain VC1 within a suitable voltage range as previously described) and Q2 is operated with peak current control. CLK initiates the turn on of both Q1 and Q2 at the same time for each cycle of CLK. As shown in FIGS. 3, G1 and G2 both go high at time t1 in response to CLK going high which turns both Q1 and Q2 on at about time t1. The current IL1 increases from zero starting at time t1 at a rate proportional to the input voltage VR. The voltage VC1 across C1 reverse biases diode D2 and is impressed across the output filter (L2 and C2) to increase the current IL2. IL2 reaches a predetermined peak current level IPK at time t2 and the buck controller 209 of the controller 101 turns off Q2 by pulling G2 low. Diode D2 forward biases and IL2 decreases at a rate proportional to the output voltage VO after time t2. After duration of the time period $T_{ON}$ from time t1, the boost controller 203 of the controller 101 asserts G1 low to turn Q1 off at time t3 to transfer energy from L1 to C1. From time t3, IL1 linearly decreases and reaches zero at time t4. Operation is repeated for each cycle of CLK, such as the next cycle beginning at subsequent time t5 when G1 and G2 are next asserted high to turn on Q1 and Q2.

Figure 4:
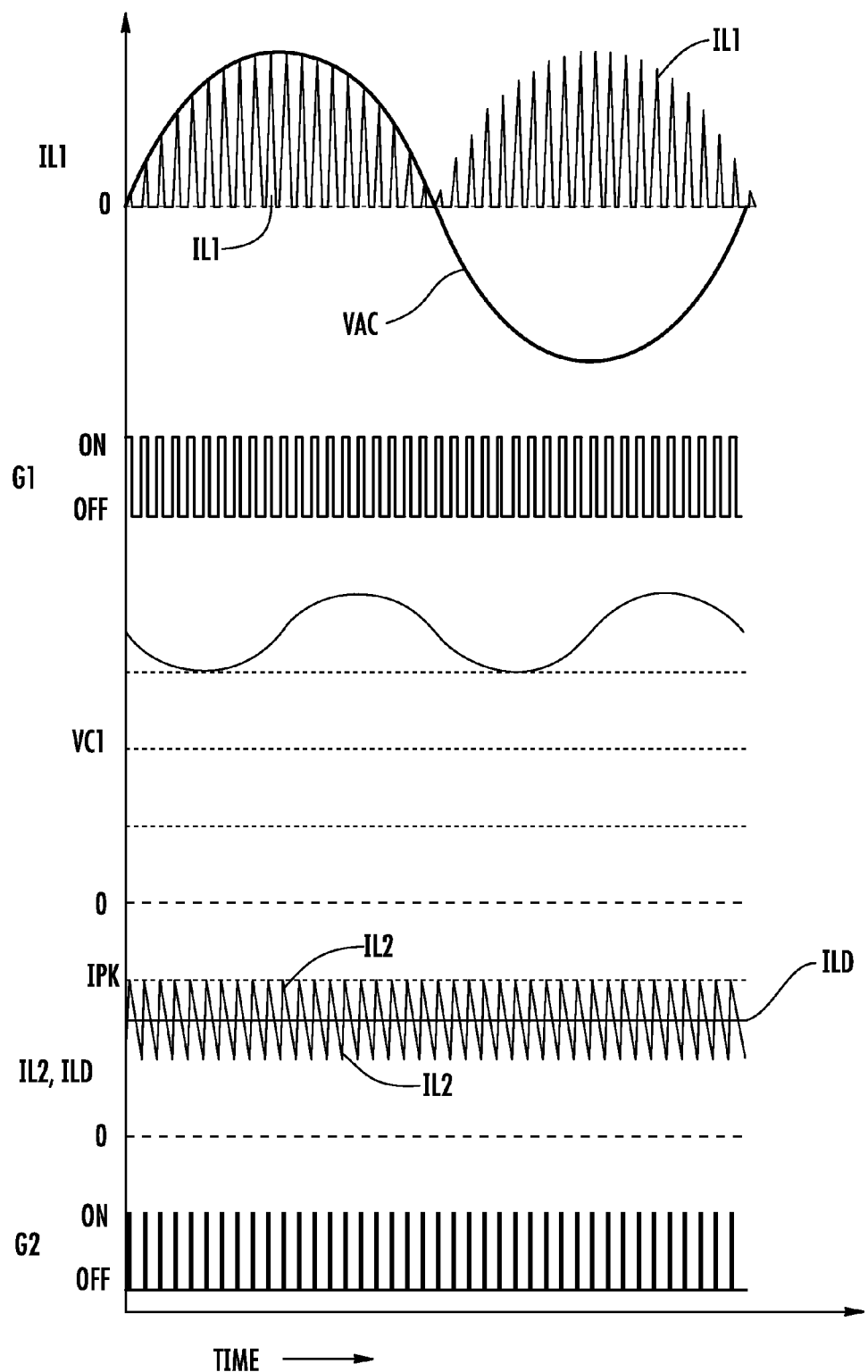
FIG. 4 is a timing diagram showing exemplary operating waveforms over one period of the AC input voltage without dimming.

FIG. 4 is a timing diagram showing exemplary operating waveforms over one period of VAC without dimming. As shown, the signals VAC, IL1, G1, VC1, IL2, ILD and G2 are plotted versus time for a full cycle of VAC. VAC and IL1 are normalized and superimposed, and IL2 and ILD are again superimposed. In the illustrated configuration, the boost converter 103 is operated in discontinuous current mode with "constant" on-time (periodically adjusted). The peak current in the inductor L1 follows the envelope of the rectified AC voltage VR. The resulting power factor and line current harmonic content meet regulatory requirements. The energy delivered by the boost converter 103 varies as a function of the rectified AC voltage VR as shown by the variation of the voltage VC1. The controller 101 adjusts the duty cycle of the buck converter 105 in response to application of VC1 and thus collectively regulates the load current ILD. In one embodiment, the peak current level (IPK) of IL2 is predetermined and constant, so that the duty cycle of G2 (and thus Q2) varies with variation of VC1. This minimizes the line frequency flicker and the energy storage.

The output capacitance C2 is sized for the switching frequency ripple and is several orders of magnitude lower than the output capacitor of a conventional single-stage flyback converter. In a more specific embodiment, for example, the capacitor C2 is only 2.2 microFarads (μF) for a 6 Watt (W) converter (e.g., 18 Volts (V), 350 milli-Ampere (mA) converter), whereas the output capacitor for a corresponding 6W single-stage flyback converter according to the conventional configuration is on the order of about 20 μF.

Figure 5:
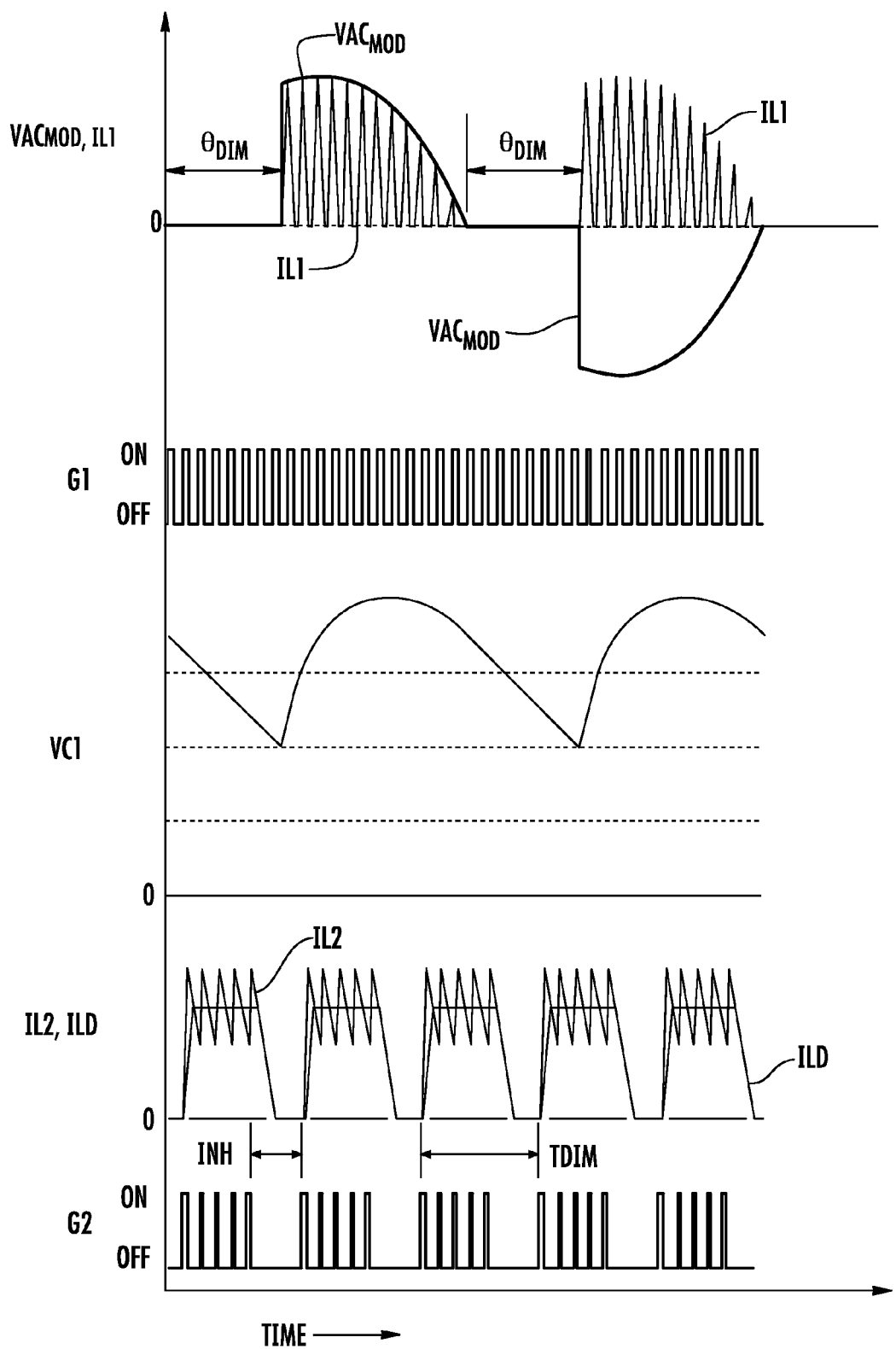
FIG. 5 is a timing diagram showing exemplary operating waveforms over one period of the AC input voltage with dimming.

FIG. 5 is a timing diagram showing exemplary operating waveforms over one period of VAC, similar to the timing diagram of FIG. 4, except with dimming. As shown, the signals $VAC_{MOD}$, IL1, G1, VC1, IL2, ILD and G2 are plotted versus time for a full cycle of VAC. $VAC_{MOD}$ and IL1 are normalized and superimposed, and IL2 and ILD are again superimposed. $VAC_{MOD}$ is zero for a percentage of time over the AC period based on the phase or dimming angle $\theta_{DIM}$. In the illustrated embodiment, $VAC_{MOD}$ is zero for a dimming angle $\theta_{DIM}$ of approximately 37% of the AC period (e.g., about 67 degrees for each half cycle). The phase angle sensor 213 of the controller 101 measures the AC dimming angle and provides PHS, and the dimming controller 215 correspondingly asserts the inhibit signal INH to inhibit the buck converter 105 to skip cycles of Q2 based on the measured phase angle. The average load current ILD is proportional to the dimming angle $\theta_{DIM}$. When driving LEDs as the load, the corresponding light intensity of the LEDs is proportional to the dimming angle $\theta_{DIM}$.

Q1 is continuously gated with an on-time that is constant over the AC half cycle but is periodically adjusted to adjust VC1 as previously described. Even with the dimmer blocking a portion of the AC input, Q1 is continuously gated to provide controlled input impedance which helps suppress ringing on the input filter and provides a path for the leakage of the dimmer. When the dimmer conducts, the boost converter 103 provides the holding current of the dimmer and replenishes the voltage VC1 on C1.

The energy delivered from VAC (or $VAC_{MOD}$) by the boost converter 103 varies with the AC input. As a result, a significant voltage ripple at the rectified frequency is observed on the capacitor C1. The buck converter 105 is tolerant of large voltage ripple on C1 and adjusts its duty cycle to regulate the peak L2 current to minimize ripple across the load 111 (which causes flicker of LEDs when LEDs are the load 111). This allows the capacitance value of C1 to be reduced or minimized and a non-electrolytic dielectric to be selected for long lifetime. Minimizing the capacitance also reduces the inrush current when the dimmer first triggers.

In one more specific embodiment, the capacitor C 1 of the converter 100 is only about one-tenth the size of a corresponding capacitor in a conventional converter. In an exemplary configuration, the capacitor is only 0.5 μF for a converter according to one embodiment of the present invention as compared to 4.7 μF for a conventional converter.

The boost converter 103 and the buck converter 105 operate substantially independently during dimming. The load current ILD is pulse width modulated (PWM dimming) by periodically inhibiting the buck converter 105. The small output capacitance of C2 ensures that ILD rapidly slews between zero and the regulated current, and avoids the need for an additional FET in series with the load 111.

Figure 6:
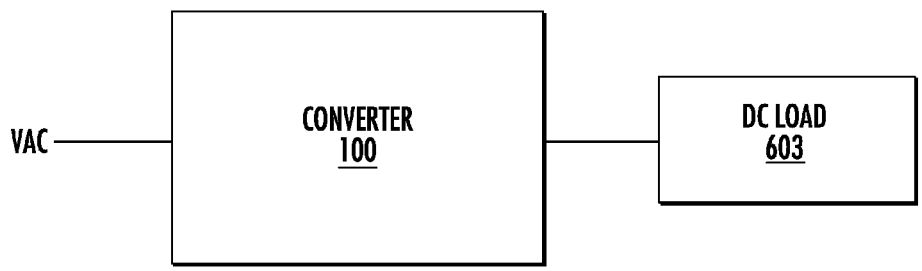
FIGS. 6-9 illustrate various electronic devices using the converter of FIG. 1.
Figure 7:
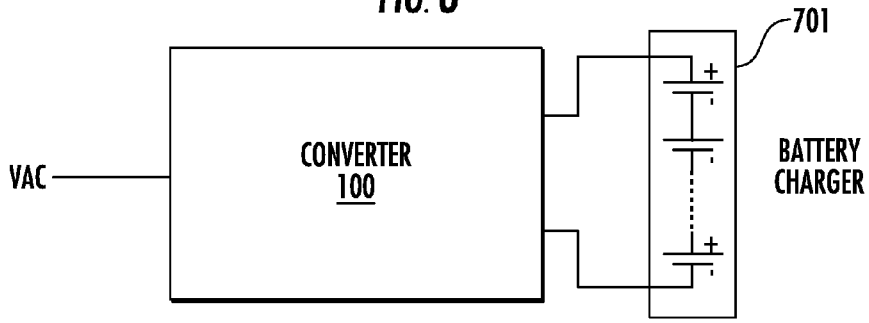
Figure 8:
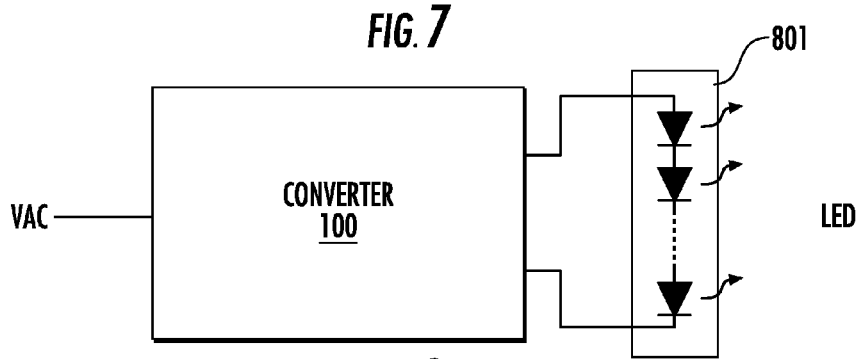
Figure 9:
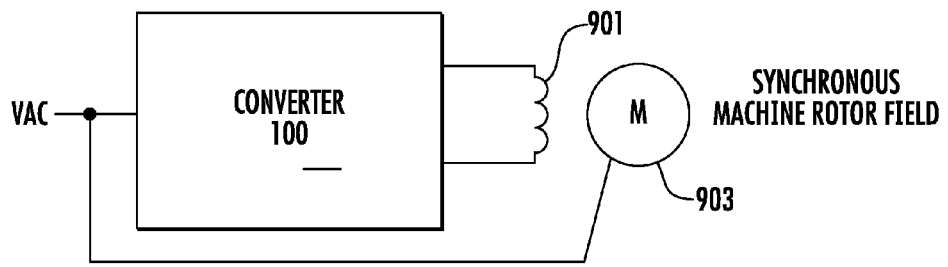

FIGS. 6-9 illustrate various electronic devices using the converter 100. As shown in FIG. 6, the converter 100 receives VAC and drives any type of DC load 603 as the load 111. As shown in FIG. 7, the converter 100 receives VAC and charges a battery or battery bank 701 including one or more rechargeable batteries as the load 111. As shown in FIG. 8, the converter 100 receives VAC and provides current to one or more light-emitting diodes (LEDs) 801 as the load 111. As shown in FIG. 9, the converter 100 receives VAC and provides current to a coil 901 or the like as the load 111 to generate a magnetic field for an electric motor 903 or the like.

Figure 10:
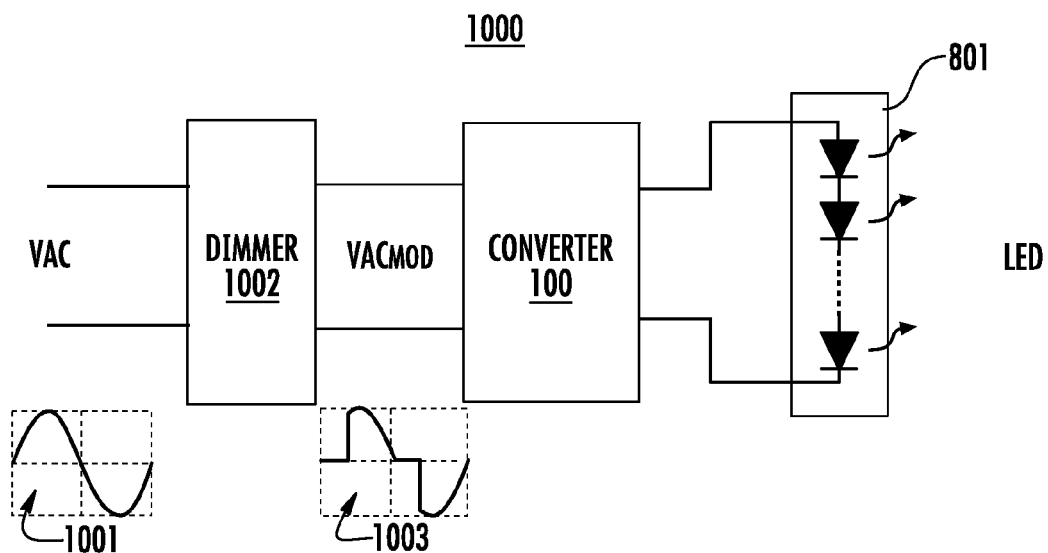
FIG. 10 is a block diagram of an electronic device configured in a similar manner as that shown in FIG. 8 including the converter of FIG. 1 and a conventional dimmer for providing current to one or more LEDs.

FIG. 10 is a block diagram of an electronic device 1000 configured in a similar manner as that shown in FIG. 8 including the converter 100 and a conventional dimmer 1002 for providing current to one or more LEDs 801. In this case, the dimmer 1002 receives VAC (e.g., AC line voltage) and provides the AC conductive angle modulated voltage or "chopped" voltage $VAC_{MOD}$, which is provided to the input of the converter 100. In one embodiment, the dimmer 1002 operates to selectively chop one or both of the leading edge and the trailing edge of VAC, depicted at 1001, at any phase angle between 0 and 180 degrees for every half cycle (i.e., 180 degrees), to provide $VAC_{MOD}$. An exemplary form of $VAC_{MOD}$ is depicted at 1003 in which the leading edge is chopped during every half cycle of VAC. In one embodiment, the dimmer 1002 uses a TRIAC (not shown) or the like to delay the VAC wave shape near zero until the predetermined phase angle. The greater the dimmer phase angle, the more VAC is chopped or zeroed to reduce the voltage of $VAC_{MOD}$. Once the phase angle is reached per half cycle, VAC steps up to the line voltage (e.g., the TRIAC conducts) and the remaining portion of VAC is output to the converter 100.

The converter 100 provides an advantage for dimming operation as compared to a conventional line dimmer circuit for the electronic device 1000. The converter 100 regulates the LED current. In this case, the average LED current and the corresponding amount of light output are proportional to the dimmer phase angle. Conventional LED dimmers use complex control to derive the dimming phase angle and then regulate the average LED current in proportion to the phase angle. The converter 100 does not use complex control and automatically regulates the average LED current in proportion of the phase angle.

Alternative control methods including other types of pulse width modulation (PWM) or pulse frequency modulation (PFM) are contemplated for both the boost converter 103 and the inverting buck converter 105 as controlled by the controllers 203 and 209. For example, the boost converter 103 may operate in a critical current mode in which the switch Q1 is turned on when the inductor current IL1 reaches zero and turned off after a fixed on-time or at a peak current responsive to an error signal. As shown in FIG. 3, for example, rather than turn on based on the clock signal, G1 goes high to turn Q1 on as soon as IL1 reaches zero. In this case, the resulting switching frequency varies with input voltage and is not based on a clock signal. The inverting buck converter 105 may operate using average current mode control in which the average load current is regulated based on a reference level. In this case, the buck controller 209 adjusts the buck pulse width (e.g., G2 provided to Q2) in response to the error and does not specify turn on or turn off edges.

Figure 11:
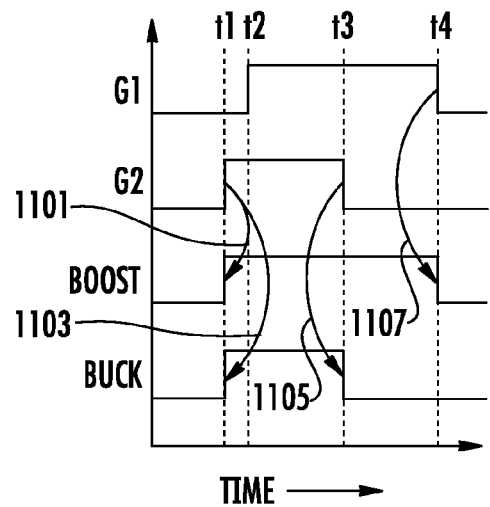
FIGS. 11 and 12 are timing diagrams illustrating the relationship between the gate drive signals G1 and G2 and the boost and buck pulses used to control boost and buck operation, respectively.
Figure 12:
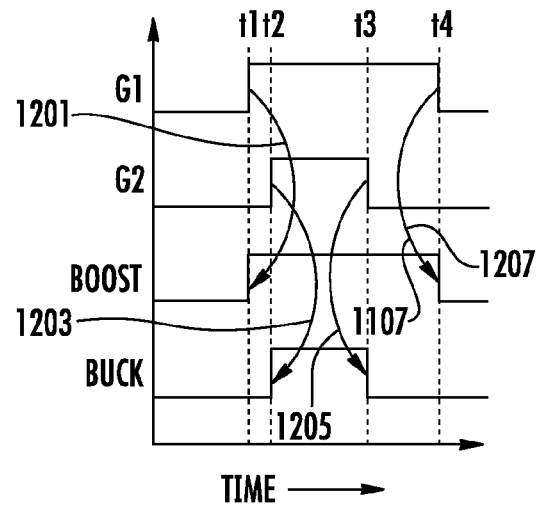

In any of the control methods employed, each boost pulse width is wider than the corresponding buck pulse width based on independent control to decoupled buck and boost operation. It is noted, however, that because of the cascade configuration, each boost pulse is initiate by turn on of either switch Q1 or Q2. FIGS. 11 and 12 are timing diagrams illustrating the relationship between the gate drive signals G1 and G2 associated with turn on and turn off of the switches Q1 and Q2, respectively, and the boost (BOOST) and buck (BUCK) pulses used to control boost and buck operation, respectively. In each timing diagram, signals G1 and G2 are plotted along with a BOOST pulse and a corresponding BUCK pulse versus time. As shown in FIG. 11, G2 may be asserted before G1 in each cycle or in any given cycle. Since either switch Q1 or Q2 initiates the current IL1 through the inductor L1, each BOOST pulse begins when either switch Q1 or Q2 is turned on. Each BOOST pulse is terminated when Q1 is turned off. Each BUCK pulse is initiated when Q2 is turned on, and is terminated when Q2 is turned off.

In FIG. 11, G2 rising at time t1 initiates both the BOOST and the BUCK pulses as illustrated by arrows 1101 and 1103, respectively. The rising edge of G1 occurs later at time t2 while G2 is still high. The subsequent falling edge of G2 at time t3 terminates the BUCK pulse as illustrated by arrow 1105. The subsequent falling edge of G1 at time t4 terminates the BOOST pulse as illustrated by arrow 1107.

In FIG. 12, G1 rising at time t1 initiates the BOOST pulse as illustrated by arrow 1201. The rising edge of G2 occurs at later time t2 and initiates the BUCK pulse as illustrated by arrow 1203. The subsequent falling edge of G2 at time t3 terminates the BUCK pulse as illustrated by arrow 1205. The subsequent falling edge of G1 at time t4 terminates the BOOST pulse as illustrated by arrow 1207.

Disclosed herein is an cascade boost converter and inverting buck converter which uses inductors instead of transformers, does not require electrolytic capacitors, and is configured so that the feedback and control signals share a common voltage reference (such as ground or any other suitable positive or negative reference voltage). The driver converter provides constant load current with minimal ripple (or flicker)

and provides high power factor with low harmonic content. Also disclosed is a control method that operates with existing dimmers, pulse width modulates the load current responsive to the dimming angle, and does not require an additional switching transistor in series with the load.

A converter according to one embodiment provides relatively constant load current with minimal ripple, meets the AC power quality standards, and operates with existing dimmers at a lower cost than conventional configurations. A converter according to one embodiment uses inductors instead of transformers, and is configured so that all feedback and control signals share a common voltage reference. A converter according to one embodiment and corresponding control method operate with existing dimmers to smoothly control LED illumination, and do not require an additional switch in series with the LEDs. The transistors of the disclosed converter have a lower peak voltage stress when compared with the stress applied in a conventional flyback configuration. A snubber circuit is rendered unnecessary.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A converter system, comprising:
a cascade boost converter and inverting buck converter for converting a rectified AC voltage to a DC output current;
a controller having input and output control signals referenced to a common voltage, wherein said controller is configured to control switching of said boost converter and switching of said inverting buck converter in an independent manner to decouple operation of said inverting buck converter from operation of said boost converter; and
wherein said controller is configured to control said boost converter with a plurality of boost pulses on a boost pulse signal referenced to said common voltage, wherein said controller is configured to control said inverting buck converter with a plurality of buck pulses on a buck pulse signal referenced to said common voltage, and wherein each of said plurality of boost pulses is wider than a corresponding one of said plurality of buck pulses.

2. The converter system of claim 1, wherein said boost converter comprises a first switch, wherein said inverting buck converter comprises a second switch, and wherein said controller is configured to initiate each of said plurality of boost pulses by turning on either one of said first and second switches.

3. The converter system of claim 1, wherein said controller is configured to control said boost converter based on constant on-time control and to control said inverting buck converter based on peak current control.

4. The converter system of claim 1, wherein:
said controller is configured to control said boost converter based on constant on-time control using a fixed time period;
wherein said boost converter has an output coupled to a capacitor which is coupled to an input of said inverting buck converter;
wherein said controller comprises a voltage sensor configured to determine voltage across said capacitor and to provide a sense signal indicative thereof referenced to said common voltage; and
wherein said controller periodically adjusts said fixed time period based on said sense signal.

5. The converter system of claim 1, wherein:
said rectified AC voltage comprises an AC conductive angle modulated voltage; and
wherein said controller inhibits switching of said inverting buck converter during a portion of each cycle of a dimming frequency, wherein said portion is based on a phase angle of said AC conductive angle modulated voltage.

6. The converter system of claim 1, wherein:
said boost converter comprises:
a first inductor having a first end receiving said rectified AC voltage and having a second end;
a first switch having a first current terminal coupled to said second end of said inductor, having a second current terminal coupled to said common voltage, and having a control terminal receiving a first control signal referenced to said common voltage from said controller;
a first diode having an anode coupled to said second end of said inductor and having a cathode; and
a first capacitor having a first end coupled to said cathode of said first diode and having a second end; and
wherein said inverting buck converter comprises:
a second switch having a first current terminal coupled to said cathode of said first diode, having a second current terminal coupled to said common voltage, and having a control terminal receiving a second control signal referenced to said common voltage from said controller;
a second diode having an anode coupled to said second end of said first capacitor and having a cathode coupled to said common voltage;
a second inductor having a first end coupled to said second end of said first capacitor and having a second end coupled to an output node; and
a second capacitor coupled between said output node and said common voltage.

7. The converter system of claim 6, wherein said controller comprises:
a constant on-time generator which asserts said first control signal to turn on said first switch upon initiation of each cycle of a clock signal and to turn off said first switch after a predetermined time period during said each cycle of said clock signal;
a current sensor which senses current through said second inductor; and
a peak current controller which asserts said second control signal to turn on said second switch upon said initiation of each cycle of said clock signal and to turn off said second switch during said each cycle of said clock signal when said current through said second inductor reaches a peak value.

8. The converter system of claim 7, wherein said rectified AC voltage comprises an AC conductive angle modulated voltage, and wherein said controller further comprises:
a phase angle sensor which senses a phase angle of said AC conductive angle modulated voltage and provides a phase signal indicative thereof;
a dimming controller which generates an inhibit signal which toggles between first and second levels at a dimming frequency and with a duty cycle based on said phase signal; and wherein said peak current controller inhibits switching of said second switch while said inhibit signal is at said first level.

9. The converter system of claim 1, further comprising a DC load coupled to an output of said inverting buck converter and receiving said DC output current.

10. The converter system of claim 9, wherein said DC load comprises a least one light emitting diode.

11. A controller for controlling a cascade boost converter and an inverting buck converter for converting a rectified AC voltage to a DC output current, comprising:
a boost controller configured to provide at least one first control signal referenced to a common voltage for controlling switching of the boost converter;
a buck controller configured to provide at least one second control signal referenced to the common voltage for controlling switching of the inverting buck converter in an independent manner to decouple operation of the inverting buck converter from operation of the boost converter; and
wherein said boost controller is configured to generate a plurality of boost pulses on said first control signal;
wherein said buck controller is configured to generate a corresponding plurality of buck pulses on said second control signal; and
wherein each of said plurality of boost pulses is wider than a corresponding one of said plurality of buck pulses.

12. The controller of claim 11, wherein the boost converter includes a first switch and the inverting buck converter includes a second switch, said controller further comprising:
a constant on-time generator for turning on the first switch upon initiation of each cycle of a clock signal and for turning off the first switch after a predetermined time period during said each cycle of said clock signal;
a current sense input for sensing current through the buck converter and for providing a current sense signal indicative thereof referenced to the common voltage; and
a peak current controller for turning on the second switch upon initiation of each cycle of said clock signal and for turning off the second switch when said current sense signal indicates a peak current level.

13. The controller of claim 12, wherein a capacitor is coupled between the boost converter and the inverting buck converter, wherein said controller further comprises:
a voltage sense input referenced to the common voltage for sensing voltage across the capacitor and for providing a voltage sense signal indicative thereof; and
wherein said constant on-time generator is configured to adjust said predetermined time period based on said voltage sense signal.

14. The controller of claim 11, wherein the rectified AC voltage comprises an AC conductive angle modulated voltage, wherein said controller further comprises:
a phase angle sensor which senses a phase angle of the AC conductive angle modulated voltage and provides a phase signal indicative thereof;
a dimming controller which generates an inhibit signal which toggles between first and second levels at a dimming frequency and with a duty cycle based on said phase signal; and
wherein said buck controller is configured to inhibit switching of the inverting buck converter while said inhibit signal is at said first level.

15. A method of controlling a cascade boost converter and inverting buck converter for converting a rectified AC voltage to a DC output current, comprising:
generating a plurality of boost pulses on a boost pulse signal referenced to a common voltage for controlling switching of the boost converter;
generating a plurality of buck pulses on a buck pulse signal referenced to the common voltage for controlling switching of the inverting buck converter in an independent manner to decouple operation of the inverting buck converter from operation of the boost converter; and
wherein said generating a plurality of boost pulses and said generating a plurality of buck pulses comprises generating each boost pulse to be wider than a corresponding buck pulse.

16. The method of claim 15, wherein the boost converter comprises a first switch and wherein the inverting buck converter comprises a second switch, and wherein said generating a plurality of boost pulses comprises turning on either one of the first and second switches.

17. The method of claim 15, wherein the boost converter comprises a first switch and wherein the inverting buck converter comprises a second switch, said method further comprising:
turning the first and second switches on upon initiation of each cycle of a clock signal;
monitoring current through the inverting buck converter;
turning off the second switch when the current through the inverting buck converter reaches a peak level; and
turning off the first switch after a constant time period during each cycle of the clock signal.

18. The method of claim 17, further comprising:
providing a capacitor between the boost converter and inverting buck converter;
monitoring voltage across the capacitor and providing a sense signal; and
periodically adjusting the constant time period based on the sense signal.

19. The method of claim 15, wherein the rectified AC voltage comprises an AC conductive angle modulated voltage, further comprising:
sensing a phase angle of the AC conductive angle modulated voltage and providing a phase signal indicative thereof;
generating an inhibit signal which toggles between first and second levels at a dimming frequency and with a duty cycle based on the phase signal; and
inhibiting switching of the inverting buck converter while the inhibit signal is at the second level.

* * * * *